(12) United States Patent
Goodman et al.

(10) Patent No.: US 8,391,771 B2
(45) Date of Patent: Mar. 5, 2013

(54) ORDER-BASED HUMAN INTERACTIVE PROOFS (HIPS) AND AUTOMATIC DIFFICULTY RATING OF HIPS

(75) Inventors: Joshua T. Goodman, Redmond, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1238 days.

(21) Appl. No.: 11/759,464

(22) Filed: Jun. 7, 2007

(65) Prior Publication Data
US 2007/0234423 A1 Oct. 4, 2007

Related U.S. Application Data

(62) Division of application No. 10/669,545, filed on Sep. 23, 2003, now Pat. No. 7,533,411.

(51) Int. Cl.
*G09B 3/00* (2006.01)
(52) U.S. Cl. ........ 434/350; 434/323; 434/322; 713/182; 726/2
(58) Field of Classification Search .................. 713/182; 434/323, 322; 726/2; 715/188
See application file for complete search history.

(56) References Cited

U.S. PATENT DOCUMENTS

| | | | | |
|---|---|---|---|---|
| 5,313,637 A * | 5/1994 | Rose | | 726/7 |
| 5,784,464 A * | 7/1998 | Akiyama et al. | | 713/155 |
| 5,911,581 A * | 6/1999 | Reynolds et al. | | 434/236 |
| 5,927,988 A * | 7/1999 | Jenkins et al. | | 434/116 |
| 5,954,516 A * | 9/1999 | Heinberg | | 434/322 |
| 6,195,698 B1 * | 2/2001 | Lillibridge et al. | | 709/225 |
| 6,210,166 B1 * | 4/2001 | Jenkins et al. | | 434/185 |
| 7,073,067 B2 * | 7/2006 | Mizrah | | 713/183 |
| 7,149,899 B2 * | 12/2006 | Pinkas et al. | | 713/182 |
| 7,624,277 B1 * | 11/2009 | Simard et al. | | 713/182 |
| 7,653,944 B2 * | 1/2010 | Chellapilla et al. | | 726/27 |
| 2002/0120853 A1 * | 8/2002 | Tyree | | 713/188 |
| 2004/0073813 A1 | 4/2004 | Pinkas et al. | | |
| 2004/0119746 A1 | 6/2004 | Mizrah | | |
| 2004/0123151 A1 | 6/2004 | Mizrah | | |
| 2004/0225880 A1 * | 11/2004 | Mizrah | | 713/155 |
| 2005/0065802 A1 | 3/2005 | Rui et al. | | |
| 2005/0154925 A1 * | 7/2005 | Chitrapu et al. | | 713/202 |
| 2005/0229251 A1 * | 10/2005 | Chellapilla et al. | | 726/23 |
| 2005/0273866 A1 * | 12/2005 | Brown et al. | | 726/28 |
| 2007/0026372 A1 * | 2/2007 | Huelsbergen | | 434/322 |
| 2007/0143624 A1 * | 6/2007 | Steeves | | 713/182 |
| 2009/0055910 A1 * | 2/2009 | Lee | | 726/6 |
| 2009/0094687 A1 * | 4/2009 | Jastrebski et al. | | 726/6 |
| 2009/0113294 A1 * | 4/2009 | Sanghavi et al. | | 715/269 |

OTHER PUBLICATIONS

Chew et al. "BaffleText: a Human Interactive Proof" Proceedings of the SPIE. Santa Clara, CA. Jan. 22-23, 2003.*
Gligor, Virgil. "Guarenteeing Access in Spite of Dirtibuted Service-Flooding Attacks" Proceedings of the Security Protocols, 11th International Workshop, Cambridge, UK, Apr. 2-4, 2003.*

* cited by examiner

*Primary Examiner* — Robert J Utama
(74) *Attorney, Agent, or Firm* — Lee & Hayes, PLLC

(57) ABSTRACT

The present invention involves a system and method that facilitate identifying human interaction by utilizing HIPs such as order-based HIPs and determining a difficulty rating of any type of HIPs in an automated fashion. Order-based HIPs require a user to identify elements in the sequence as well as to identify a correct order of the elements in the sequence. The invention involves presenting a user with at least two HIPs such that the HIP can be of known and/or unknown difficulty. A user that correctly answers the HIP of known difficulty gains access to the HIP-controlled resource, action or application. The user's response to the HIP of unknown difficulty can then be examined and employed to determine whether that HIP is too difficult for humans to solve. Alternatively, at least one HIP can be presented. Difficulty of individual HIP parameters can also be determined.

30 Claims, 11 Drawing Sheets

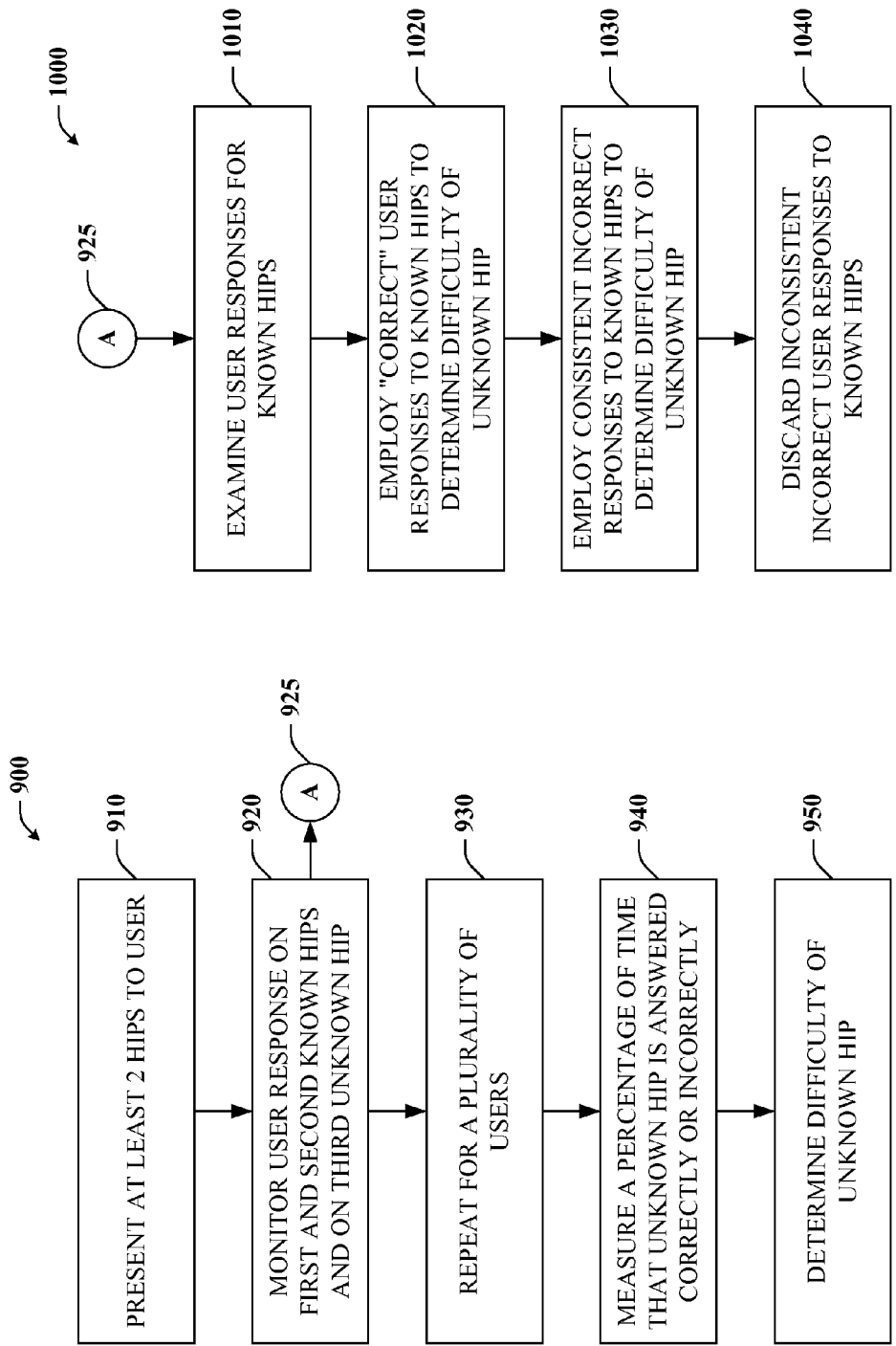

ORDER-BASED HUMAN INTERACTIVE PROOFS (HIPS) AND AUTOMATIC DIFFICULTY RATING OF HIPS

CROSS-REFERENCE TO RELATED APPLICATIONS

This application is a divisional of U.S. patent application Ser. No. 10/669,545, filed Sep. 23, 2003, entitled "ORDER-BASED HUMAN INTERACTIVE PROOFS (HIPS) AND AUTOMATIC DIFFICULTY RATING OF HIPS". The entirety of the aforementioned application is incorporated herein by reference.

TECHNICAL FIELD

This invention is related to systems and methods for identifying human interaction, and more particularly for providing order-based human interactive proofs and determining the difficulty of a human interactive proof string in an automated fashion.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

Although spam is becoming a significant problem with respect to computing over the internet, internet abuse in general is on the rise. Spammers typically abuse free email systems by signing up for hundreds of free email accounts to send out masses of unsolicited messages. However, other users have found ways to abuse the internet the many conveniences and the seemingly unlimited access to the internet as well.

Using automated techniques similar to spammers, these types of users have also been able to program their computers to automatically sign-up for things such as free products, free services, promotional give-aways, contests, and the like by creating a multitude of user accounts for the respective freebie. In particular, imagine that a computer is programmed by an abuser to sign up one actual person for a contest 1,000 or even 10,000 times, whereas legitimate users of the contest entry process may manually sign up a few times at best. As a result, the abusive behavior by the user can provide him/her with an overwhelming advantage in the contest. For a multitude of reasons, this adversely affects the sponsors and/or companies running the various applications and systems that are victimized. As the proficiency of hackers continues to increase, so do these forms of abuse. Thus, additional measures are needed to combat Internet and email abuse.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods for generating order-based human interactive proofs (HIPs) as well as systems and methods that facilitate rating their difficulty automatically. In general, HIPs are puzzles that ask users to solve a problem to prove that they are a human being and are effectively employed to control access to any type of useful program, tool, device, system or set-up system (e.g., email, email account set-up, websites). For example, HIPs can be utilized in conjunction with password or password related systems to control user access.

HIPs can be utilized to mitigate and/or prevent automatic account sign-ups, which is a common technique of most email abusers and spammers. In the interest of saving time and keeping operation expenses at an absolute minimum, spammers, for instance, can program computers to set up email accounts automatically. Thus, hundreds of email accounts can be obtained within a relatively short amount of time, thereby allowing more spam or unsolicited messages to be sent.

In general, HIPs are relatively simple puzzles since they must be solvable by humans. The most common HIP is an image of a letter sequence that has been distorted to be difficult for an OCR (Optical Character Recognition) system to recognize, but that is still within the capabilities of a human being. Such HIPs typically either require identification of each element in an image or a correct answer to a sequence of questions. Other common HIPs ask users to repeat a sequence provided in a distorted manner (e.g., audio and/or video form).

According to conventional wisdom, it is important that a HIP have a very large number of possible answers. Otherwise, a computer can simply guess the correct answer. Historically, sequence-based HIPs have been one way to obtain a large number of possibilities because the number increases exponentially. For instance, if there are 36 characters in 8 positions, then there are $36^8$ possible answers. The number of possibilities is exponential in length. However, because such HIPs have to be simple enough for a human to solve, the current class of sequence-based HIPs is vulnerable to computer attack. In fact, some sequence-based HIPs currently in use have already been defeated.

Another function that increases very quickly is the factorial function: $k!=1\times2\times3\times4\times\ldots\times k$ This function is typical where the goal is to find the correct order. Unlike traditional sequence-based HIPs, order-based HIPs of the present invention are based at least in part upon correctly determining the order of a sequence rather than the elements of a sequence or image. In particular, the order-based HIPs make use of order-based logic. According to the present invention, examples of order-based HIPs include finding a path of a consistent type, finding a path through a maze, and finding the front-to-back (or vice versa) ordering of elements. More specifically, the subject invention provides images that include a number of identifiable objects in an image and a manner in which to calculate an order to the objects. Users are requested to determine the order of the objects and to identify the relevant individual objects in the correct order.

In one instance, order-based HIPs can require a user to find a correct order of objects such as letters, shapes, and the like. However, in some of these HIPs, it may not be enough to simply find the correct order. Rather, it can also be necessary to find the correct order of only a subset of the objects displayed in the HIP. The subset of objects can be connected or associated with one another in some consistent manner. Furthermore, such connections can be obscured at least in part by translucent shapes as well as by opaque shapes. For example, any number of alphabet letters can be connected by a particular kind of arrow (e.g., same or consistent type of arrow) whereby the correct order of letters is determined by following same kind of arrow from a "start" position to an "end" position.

In a second instance, order-based HIPs can be in the form of a three-dimensional ordering puzzle. In particular, this HIP provides a three-dimensional image. Once again, the image can include any number of shapes, objects, letters, numbers, and the like that are recognizable to humans. The user can be asked to solve a variety of ordering challenges such as to identify the order from front to back, left to right, and/or largest object to smallest object.

In a third instance, the order-based HIP can be in the form of a maze configuration. The maze configuration can require a user to (visually) manipulate a shaped block from a start position to the end position of the maze. Along the path of the block can be letters or numbers such that the correct order of the letters or numbers successfully leads the block through to the end of the maze. Because the maze demands rotations, turns and other visualizations, this type of order-based HIP would be relatively difficult for a computer to solve but relatively simple for a human to solve. Moreover, a minimum amount of knowledge about the maze and/or elements in the maze can be helpful, if not necessary, in order to successfully solve it.

Various classes of HIPs including order-based HIPs and sequence-based HIPs can be recycled and reused over and over again a limited number of times to mitigate computers (e.g., OCR software) from learning how to solve them. With this in mind, new HIPs can be generated at a sufficient rate or as desired.

Before new HIPs (order based or otherwise) are actually put to full use as a protective or blocking technique, they can be tested for effectiveness. An effective HIP is one that is easy enough for humans to solve but too difficult for computers to solve. Thus, one way to test the effectiveness of HIPs is to determine the difficulty level of them.

In addition to introducing a new class of HIPs (e.g., order-based), the present invention also provides a framework for determining the difficulty level of substantially all classes of HIPs (e.g., order-based, sequence-based, and audio) in an automated fashion to facilitate increasing their overall effectiveness.

In one aspect of the invention, HIP string difficulty can be verified by comparing user interaction with respect to multiple HIP strings. For example, instead of displaying a single HIP string to the user, a plurality (e.g., at least two) of smaller or shorter HIP strings can be presented to the user to solve. By way of example, imagine that at least a first HIP string is of known difficulty ("known HIP") and at least a second string is of unknown difficulty ("unknown HIP"). Much information relating to the difficulty of the unknown HIP can be gathered by observing user responses to the known HIP string compared to the unknown HIP. If the unknown HIP is determined to be more difficult than the known HIP, then it can be discarded for being too difficult for humans.

Furthermore, by observing the user responses to the unknown and/or known HIPs, the invention can also note mistakes that are particularly common (e.g., commonality determined on a percentage or number of responses exceeding a threshold). Therefore, if a common mistake is detected, the response can still be considered a correct or acceptable response. As a result, the HIP can be rated as not being too difficult for humans, with the new answers included as correct answers.

In accordance with another aspect of the invention, user responses can be employed to annotate a database of images or audio recordings that are presented as HIPs. For example, an identifiable image of unknown difficulty can be presented to a user who has correctly answered at least one other HIP of known difficulty. The user's response to the image can be stored and then compared to previous as well as future user responses for the same image. If the user is a trusted user (e.g., has given correct responses for HIPs of known difficulty), then the user's response to the image can be utilized to create a list of possible correct answers for that image. Likewise, if the user's response is consistent with previous responses, then the user's response can be considered correct, whether or not it actually is correct. Thus, the present invention provides an efficient system and methodology of generating new and effective HIPs.

In yet another aspect, the invention provides a manner for determining the difficulty of HIP parameters as well as the effectiveness when they are modified. HIP strings, including audio clips and visual images, are generated based in part on any number of parameters. One or more parameters can be adjusted in any number of ways to mitigate recognition by computers. By examining user responses to such adjustments, it can be determined whether a particular HIP is too difficult for a human. In other words, at the HIP parameter level, one or a subset of parameter settings can generate a HIP that is solvable by a human; whereas another slightly different parameter setting can produce a HIP that is too difficult. Hence, the difficulty of HIP parameters can be ascertained in addition to the difficulty of the HIP. Moreover, by analyzing user responses at the parameter level, HIP string generation can be optimized to effectively create useful HIPs.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 9 is a flow diagram of an exemplary method that facilitates determining HIP difficulty in an automated fashion in accordance with an aspect of the present invention.

FIG. 10 is a flow diagram of an exemplary method that facilitates identifying human interaction in accordance with an aspect of the present invention.

DETAILED DESCRIPTION OF THE INVENTION

Figure 1:
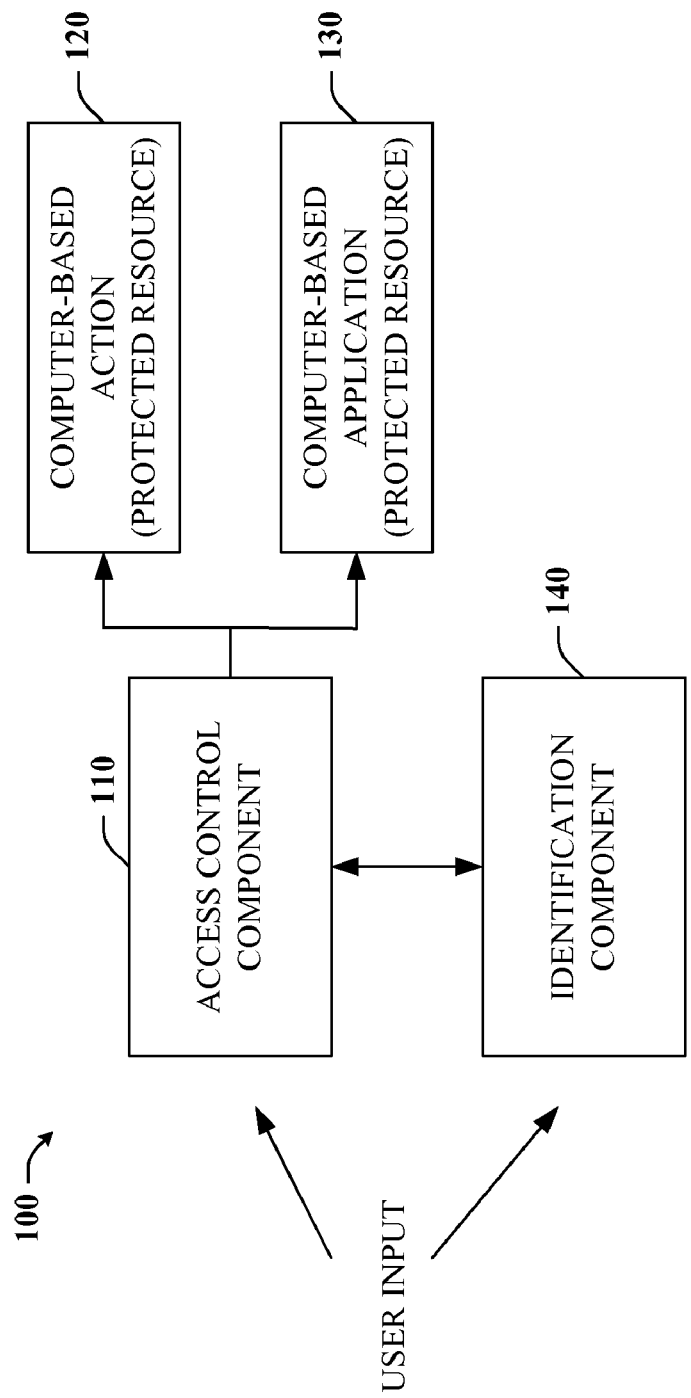
FIG. 1 is a high-level block diagram of a system that facilitates identifying human interaction in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically determining the difficulty of newly generated HIPs. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that the present invention is not merely limited to email system access, but can be suitably adapted to include access to and/or control over any type of computer-based action and/or computer-based application or any other resource to which access can lead to user abuse or non-human use. It should also be understood that the term "user" as employed in the subject invention can refer to any person or entity desiring access to some kind of protected service or application (e.g., set-up of a new email account, user account, etc.).

According to the present invention, identifying human interaction can be optimized based at least in part upon the use of order logic. As such, a new class of HIPs, referred to as order-based HIPs is introduced and discussed in FIGS. 1-5 below.

Most HIPs currently in use are of the "sequence" type. An example of a

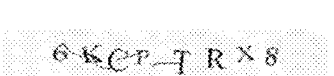

(1)

When presented with the above HIP, a user is instructed to write the characters in the above sequence. Other HIPs can provide a sequence of challenges or a single monolithic challenge. Unlike these common HIPs, order-based HIPs instruct a user to determine a correct order as well as to identify the elements as they appear in the correct order. Thus, a simple guess is neither sufficient nor practicable to gain access to the desired action or application. FIGS. 2-5 below demonstrate four different order-based HIPs in accordance with the present invention.

Referring initially to FIG. 1, there is illustrated a general block diagram of an exemplary system 100 that facilitates identifying human interaction with a computer-based action and/or application. The system 100 comprises an access controller component 110 that controls access to at least one of a computer-based action 120 and a computer-based application 130. Examples of a computer-based action 120 and/or application 130 can include opening and/or setting up user accounts, email accounts, contest entries, email notifications, voting applications, and/or any other application in which it would be desirable to control and/or restrict usage to humans.

The system 100 also includes an identification component 140 that facilitates determining that access has been initiated or requested by a human—rather than automatically by a computer. This can be accomplished in part by presenting an order-based puzzle or problem, such as a human interactive proof (HIP), to be solved. A correct response must be received by the identification component 140 in order for access to be granted to the user by the access controller component 110. When a user initiates an action (via a computer or other electronic device), such as requesting some sort of access to an application or action, the user's input can be received by either the access controller component 110 or the identification component 140.

If received initially by the access controller component 110, the access controller 110 can signal the identification component 140 to identify whether the request has been made by a human or by a computer. The relevant data and/or information can be communicated between the two components as necessary to complete the user's request. Otherwise, the user's request can be received by the identification component 140, from which the user's response to the puzzle can be communicated to the access controller 110. The access controller component 110 can then determine whether access is granted or denied.

The identification component 140 can also include or communicate with a HIP database. From the HIP database, one or more HIPs can be retrieved as needed to identify whether the user is human. Order-based HIPs, unlike sequence-based HIPs, require different techniques to be solved. In some instances, some minimum amount of knowledge about one or more objects or images included in the HIP can be necessary or required for solving it. In addition to identifying individual elements and only the relevant elements (e.g., not all are necessarily included in the correct answer), providing a correct order of the relevant elements is also important for solving the HIP. FIGS. 2-5 that follow demonstrate various nuances of order-based HIPs.

Figure 2:
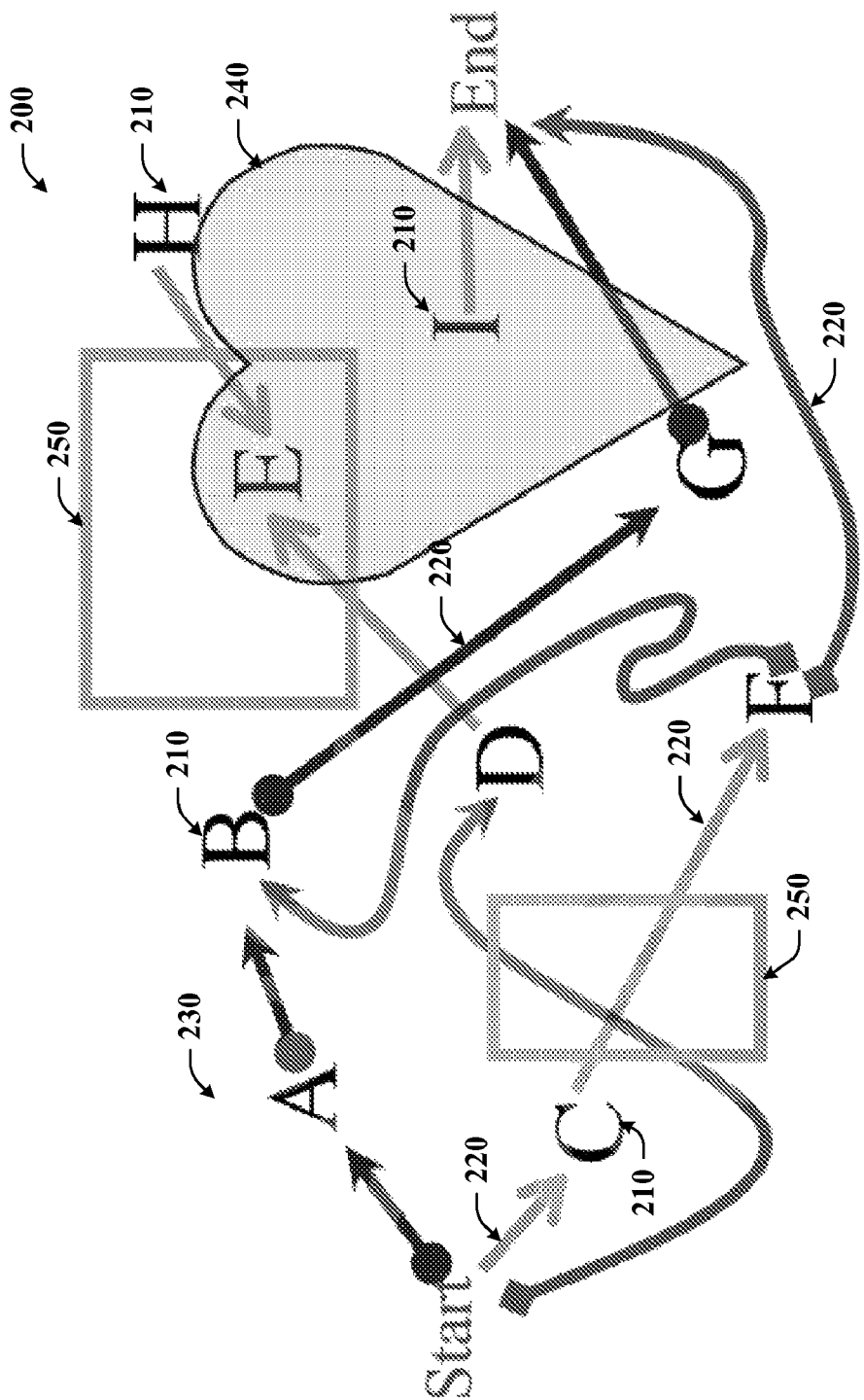
FIG. 2 is a user interface of an exemplary order-based HIP that facilitates identifying human interaction in accordance with an aspect of the present invention.

As depicted in FIG. 2, there is illustrated a user-interface of an exemplary order-based HIP 200 according to an aspect of the subject invention. This HIP 200 can be referred to as a "Start to End" HIP 200. When presented to a human user, the following instructions can accompany the HIP image:

The following picture has three kinds of arrows in it. Only one kind of arrow goes from the start to the end. Find the sequence of characters on the path from the start to the end.

Thus, in order to accurately solve the "Start to End" HIP 200, a user must determine the correct order of at least a subset of characters 210. Moreover, not all of the items or characters have to be included in the correct order (e.g., correct response), which can add another level of difficulty for computers. That is, not only must the correct order of characters be determined, but only items of a certain type, or a subset of the items, must be found and identified. In this example, the type of items refers to characters 210 which are connected by a single kind of connector or connection 220 (e.g., arrows).

The difficulty level of the "Start to End" HIP can be further modified by at least partially obscuring the connections. In one instance, the connections 220 can be partially obscured by translucent shapes in which relatively large portions of the arrows are obscured. In another instance, smaller portions of the connections can be obscured by opaque or shaded shapes. Color and/or grayscale shading can also be employed in order to modify and/or adjust the difficulty of the order-based HIP.

Still referring to FIG. 2, the HIP 200 includes characters A, B, C, D, E, F, G, H, and I which are positioned between the positions labeled START and END. Because a human user could easily recognize that more than one kind of connection is illustrated but that only characters connected by the same type of connection are the intended target, the characters 210 can be divided or grouped into at least two subsets: one subset includes the correct characters and the other includes the incorrect characters. For example, in the HIP 200, the correct order, and thus the correct subset, of characters from START to END is A-B-G. The characters A, B, and G can be described as being of a certain type since they are connected in some fashion to one another (e.g., START is connected to A, which is connected to B, which is connected to G, which is connected to END). Characters C, D, E, F, H, and I do not belong in the correct order because they do not satisfy the criteria for this puzzle (e.g., not along the path of one kind of arrow from START to END). Therefore, these characters are meant to be excluded from the correct answer.

To increase the difficulty of the HIP, a shaded heart-shaped 230 object partially obscures the characters E and I as well as portions of the arrows 220 associated therewith. Furthermore, translucent shapes 240, 250 at least partially obscure other portions of arrows 220. Moreover, providing the correct order of characters and the correct subset of characters is required to properly solve the "Start to End" HIP 200. In addition, determining which characters should be left out of the correct answer is also an important factor in solving the HIP 200.

Images which are relatively simple for humans to recognize can also be used instead of or in combination with the characters 210. For example, images of a cat, dog, house, hat, car, and butterfly may be employed alternatively, or in addition to, the characters 210. Following then, the correct subset and order of images and/or characters may be "cat-B-hat-G," for example.

Figure 3:
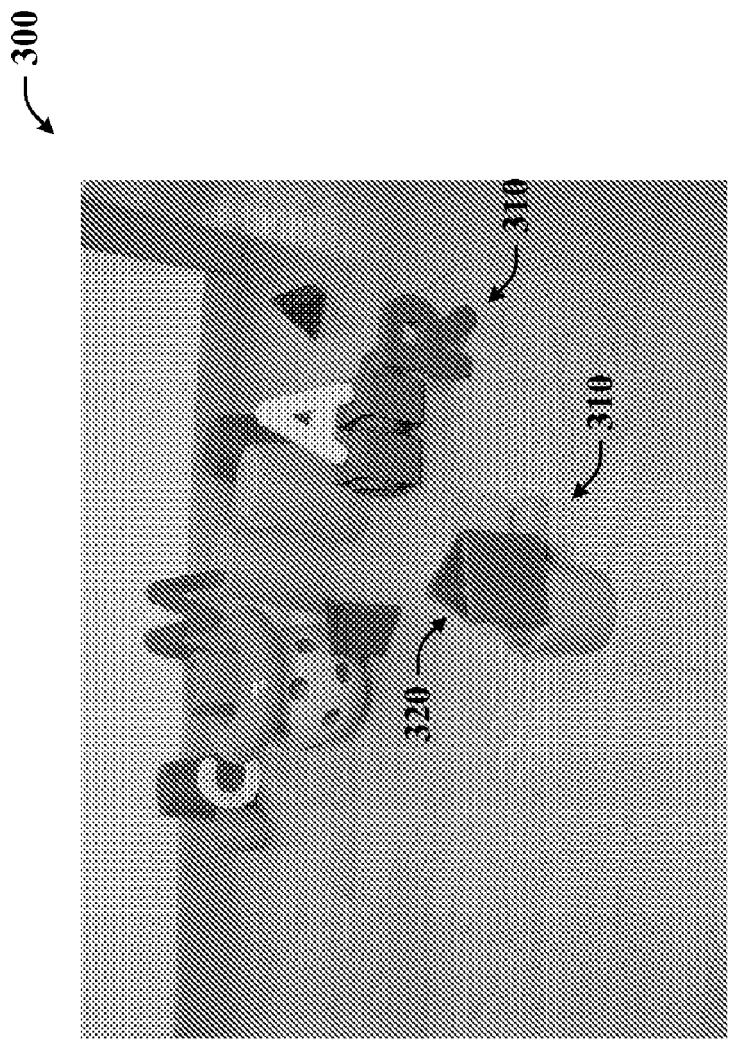
FIG. 3 is a user interface of an exemplary order-based HIP that facilitates identifying human interaction in accordance with an aspect of the present invention.

Referring now to FIG. 3, there is illustrated a user-interface of another exemplary order-based HIP 300 which utilizes three-dimensional ordering ("3-D HIP") in accordance with an aspect of the present invention. Given a three-dimensional image, a user can be asked to identify the order of characters 310 from front to back, from left to right, and/or from largest object to smallest object, for instance. For this particular HIP 300, the objective can be to identify the order of letters 310 from front to back. This type of order-based HIP requires depth computation(s) which tend to be simpler for humans than for computers. From the front to the back of the HIP image 300, the correct answer is, of course, E-R-A-M-C.

It should be appreciated that the image shown in FIG. 3 is not synthetically or computer-generated; but in practice, such an image could be easily and quickly be generated by a computer. In addition, because of the wide availability of high speed graphics chips for rendering such images, producing such images can also be relatively inexpensive. However, because automatic determination of image depth remains an unsolved problem, especially when there is a single image (as opposed to stereo images), the 3-D HIP can be a rather difficult problem to solve, particularly by OCR software.

The use of occlusion can also augment the difficulty level of the 3-D HIP 300. For example, in the figure, most of the character E is block by an object 320. However, a human has no difficulty recognizing it. To further increase the effectiveness and/or difficulty of the HIP 300, the size of the characters 310 and/or the size of shapes and/or objects employed in the image can be varied. As depicted, the characters are about all the same size. Thus, the depth computations may be fairly easy since letters that appear to be smaller are further back in the image when all of the letters are the same actual size.

The 3-D HIP 300 can be made somewhat easier for humans by including one or more various clues as to depth including at least one of shadows, reflections, fog, and partial occlusions (e.g., one object blocking another, the object including characters, shapes, etc.). For instance, shadows can come from one or more light sources to provide additional clues for the human to solve but that make it more difficult for a computer to solve. Ascertaining the difficulty rating of newly generated HIPs is discussed in further detail infra in FIGS. 6-9.

Moreover, the 3-D HIP 300 can also include a sufficient number of visual elements that provide hints of the correct order and/or hints of the identities of the characters or objects to make it solvable by a human.

Figure 4:
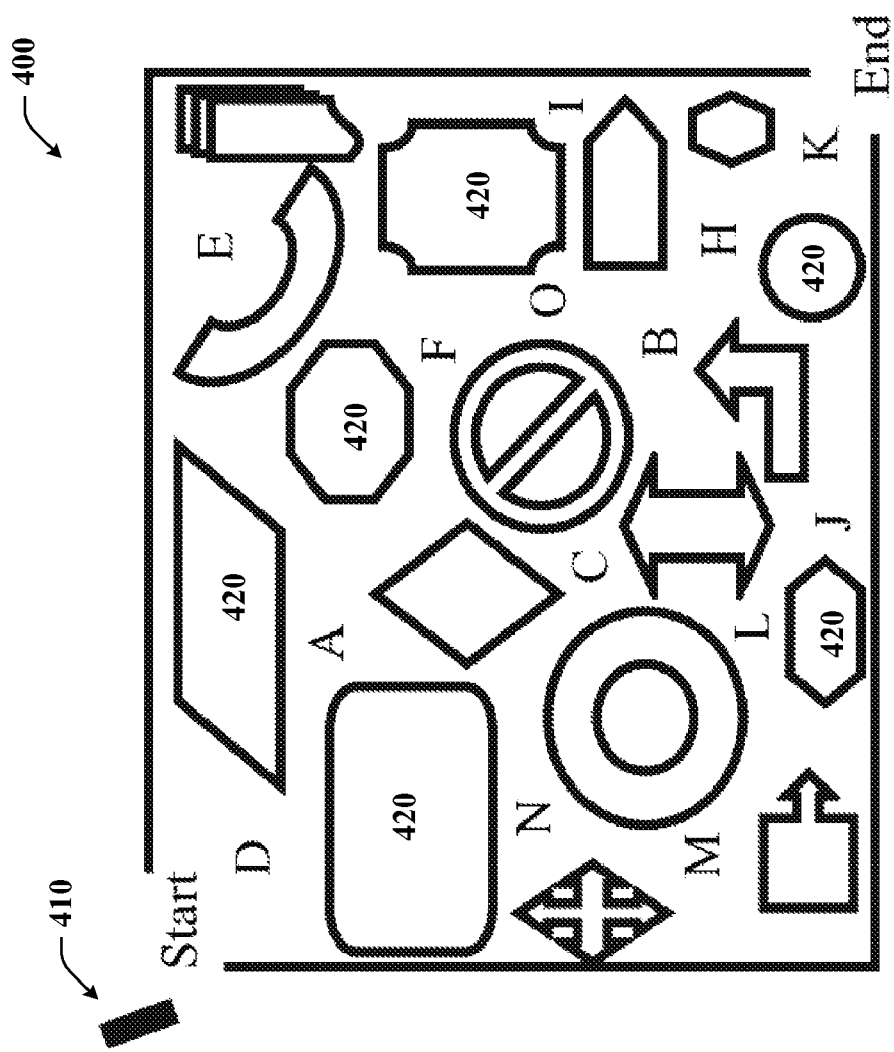
FIG. 4 is a user interface of an exemplary order-based HIP that facilitates identifying human interaction in accordance with an aspect of the present invention.

Referring now to FIG. 4, there is illustrated a user-interface of yet another exemplary order-based HIP 400 which makes use of a maze-type configuration. Such a maze can be designed so that it is difficult for computers, but not too difficult for humans to solve. According to the maze HIP 400, the objective is to maneuver the rectangular block 410 from the START to the END positions. The user must provide the order of letters in the correct path. The maze HIP 400 requires rotations, contortions, as well as other visualizations that are relatively difficult for a computer to perform. This is due in part by the employment of an odd-shaped object being maneuvered through the maze (e.g., as opposed to a round ball which is relatively easy to maneuver through a maze).

Furthermore, the rectangular block 410 must make its way through and in between other odd-shaped objects and/or images 420. Hence, solving the maze HIP requires some minimum amount of knowledge about the block 410 and/or the images 420 in order to perform the necessary visualizations, for example. Some HIPs repeatedly employ the same images as well as the same sizes of images, which can be advantageous to OCR software. Hence, the size and types of images included in the maze should vary to make it more cost-prohibitive to write HIP solving software.

In addition, the difficulty of maze HIPs can be further increased by forming a three-dimensional display of the maze to be solved and/or by incorporating pictures or images of real objects, some of which can serve as severe impediments to the rectangular block 410. This is illustrated in FIG. 5.

Figure 5:
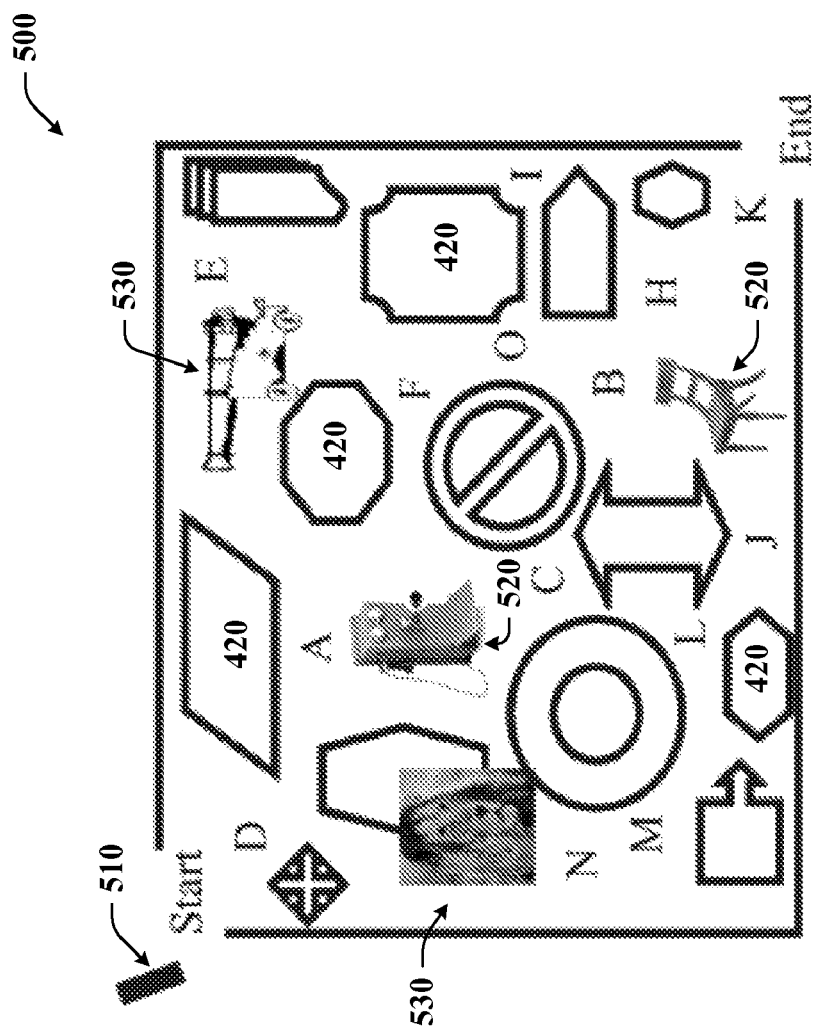
FIG. 5 is a user interface of an exemplary order-based HIP that facilitates identifying human interaction in accordance with an aspect of the present invention.

FIG. 5 demonstrates a user-interface of an exemplary maze HIP 500. Again, a user is instructed to maneuver an odd-shaped object 510 from the START to the END. In particular, the object 510 must move through and between objects 420 (see FIG. 4, supra) as well as pictures of real objects 520. More importantly, the user is told to avoid things (e.g., objects) that are dangerous. Human knowledge would indicate that a canon 530 and a lion 540 are considered to be "dangerous".

The maze can be created by first randomly generating a path for the block to take from START to END; and then generating shapes and/or "dangerous" objects in such a way that the path is never blocked. Care should be taken that no alternate path is allowed. In the given HIP 500, the correct response is D-A-F-O-B-H-K.

Moreover, some minimum knowledge of the objects such as object recognition can be necessary to correctly solve order-based HIPs—in particular, the properties of the real objects 520 to distinguish the dangerous objects from the non-dangerous objects. However, the object or identity of the object is language-independent. Therefore, when identifying the particular object in the answer, many right answers can be possible and accepted in view of the many different languages spoken today. Conversely, infrequent wrong answers are expected.

As a general matter, if wrong answers are frequently received for any given instance of a HIP (of any type, order-based or otherwise) then the HIP may be too difficult for even humans to solve and thus ineffective in blocking only non-human users from access. Hence, as new HIPs are being generated, a determination must be made as to their difficulty and ultimately as to their effectiveness before they can be fully implemented to protect and/or prevent access from non-humans.

In accordance with another aspect of the present invention, the difficulty of newly generated HIPs of any class or type can be determined in an automated fashion. This allows the average difficulty of the HIP to be increased without risking that individual HIPs become too difficult for humans. It also allows a new class of HIPs in which the computer does not know the correct answer. More discussion on this new class of HIPs will follow, infra.

As previously mentioned, the most common type of HIP is a sequence-based HIP such as:

(1)

This type of sequence-based HIP is an image of a letter-number sequence that has been distorted to be difficult for OCR software to recognize, but easy enough for a human to transcribe (e.g., 6-K-C-P-T-R-X-8). The distortion is random and thus, difficult to automatically check whether the distortion is so severe that a human would reach a wrong answer. As OCR systems improve and as hackers target specific HIPs, the difficulty of HIPs in general will need to increase. Therefore, it is increasingly important to verify that a particular instance of a HIP has not reached a point wherein a human frequently gives the wrong answer. For example, below is another actual sample of a sequence-based HIP:

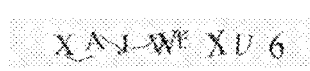

(2)

Due to the distortion of the fifth character in the above sequence, it is moderately difficult to determine whether it is an F with some extra noise or an E with some deletion.

Figure 6:
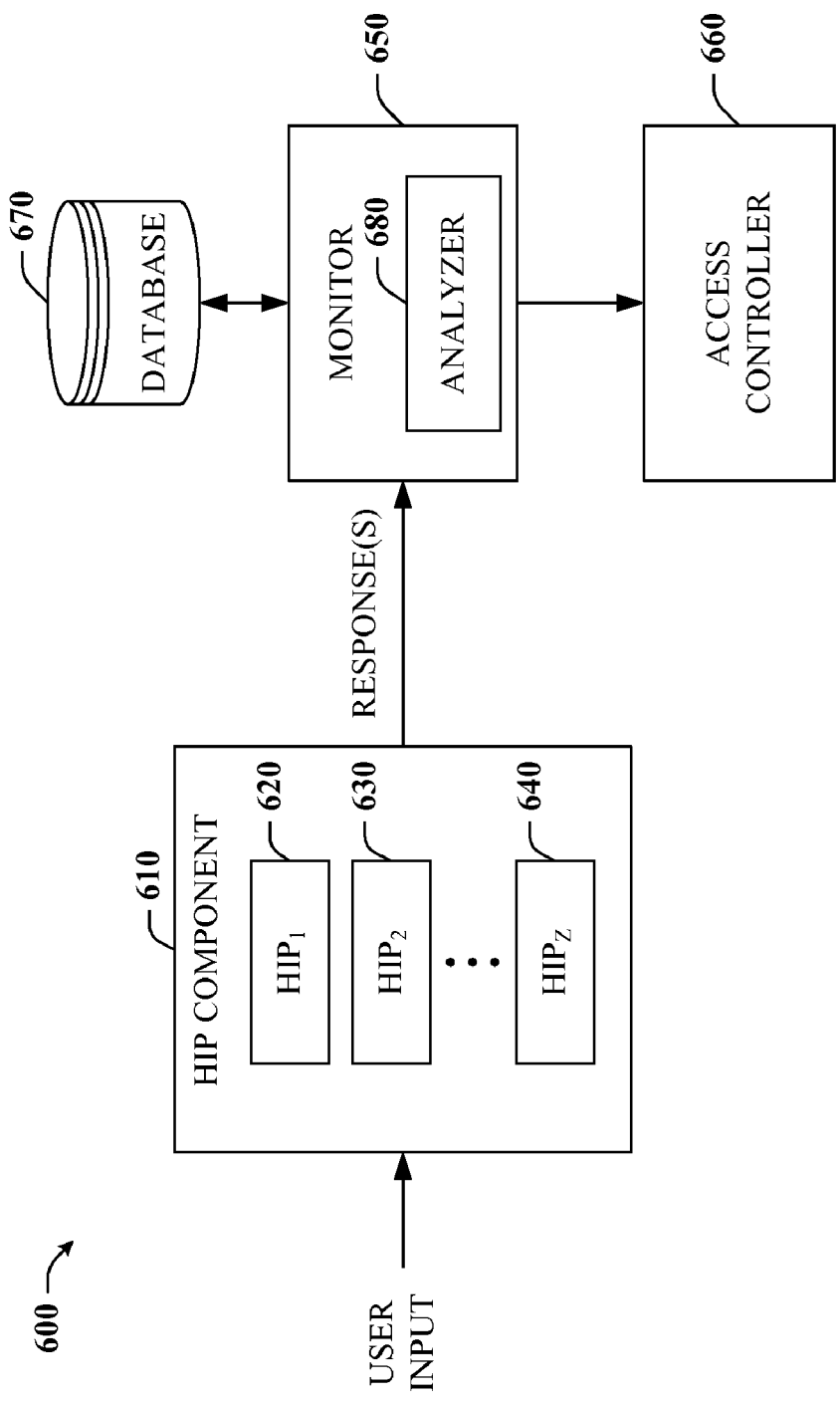
FIG. 6 is a high-level block diagram of a system that facilitates identifying human interaction in accordance with an aspect of the present invention.

In view of the foregoing, the present invention provides an exemplary system 600, as depicted by the general block diagram in FIG. 6, that facilitates verifying that a particular instance of a HIP is not too difficult in an automated fashion.

The system 600 comprises a HIP component 610 that provides at least one HIP of known difficulty (known HIP) and at least one HIP of unknown difficulty (unknown HIP), denoted as HIP1 620, HIP2 630, . . . up to HIPZ 640 (where Z is an integer greater than or equal to one). For example, rather than presenting a single HIP having 8 characters, three smaller HIPs having 4 characters each can be displayed. Two of these HIPs are known to be not too difficult (e.g., known difficulty) and one of them has an unknown difficulty.

For users who solve the two known HIPs, the system 600 can monitor how well they do on the unknown HIP by way of a monitor component 650. The monitor component 650 can monitor a user's responses to determine which HIPs are solved correctly and/or incorrectly. Users who answer the known HIP(s) correctly are granted access to the desired action or application via an access controller 660. Such user can be considered human users since they solved the known HIPs. The user's response to the unknown HIP can be saved to a database 670 for comparison to other user responses to facilitate rating the difficulty of the unknown HIP such as after the unknown HIP has been presented the desired number of times.

Such measurements and/or analyses can be performed by an analyzing component 680 coupled to or contained within the monitoring component 650 (depending on the desired system configuration). If the calculated percentage of users who provide wrong answers exceeds a threshold, then the unknown HIP can be discarded as being too difficult. The unknown HIP can be presented a set number of times such as 20, 100, or 1000 times. Thus, the percentage of time the unknown HIP is answered correctly can be more accurately measured. Unknown HIPs answered incorrectly too often such as 10%, 5% or even 1% of the time can be discarded.

In practice, imagine that we knew that

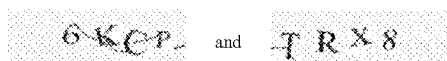

and are two HIPs that people could solve with reasonable accuracy. However, the difficulty of

has yet to be determined.

Thus, a challenge such as the following could be presented to a user:

(PART 1)          (PART 2)          (PART 3)

wherein PART 1 is an unknown HIP and PARTS 2 and 3 are known HIPs.

For users who answer the last two parts (e.g., mini HIPs) correct, the system 600 can verify whether the same user has responded to the first part correctly. If users who can consistently get the last two parts correct fail to get the first part correct, then the system can determine that the first part (e.g., unknown HIP) is too difficult. The known and unknown HIPs can be arranged in any random order, changing with each user or with every Mth user, wherein M is an integer greater than or equal to 1. This of course makes the HIP display less predictable for frequent users and/or for OCR systems.

Moreover, the system 600 presents HIPs of known difficulty which can mean that they are known not to be too difficult for humans. Since one objective of the present invention is to protect the system 600 from being attacked by a computer, the system 600 only utilizes answers from users who get the last two parts (e.g., known HIPs) correct, or in the alternative, from users who make the same or similar kinds of mistakes on the last parts that humans are expected to make. Otherwise, someone could use a computer to answer the HIPs and the system would be misled to think that the first part was hard (assuming the computer did not do a good job) when in fact it is not difficult at all.

In addition, the monitoring component 650 can optionally monitor and/or track particular mistakes that users make with respect to the unknown HIP. For instance, the fact that a determined percentage of users mistake the E for an F (e.g., fourth character of first part) can be tracked. Accordingly, the system 600 could accept an answer of F from future users as a "correct" answer. Thus, some consistently made mistakes with respect to the unknown HIP can be accepted as correct answers. Again, this determination can be based at least in part upon a threshold and a calculated percentage of users who make the same mistake.

In another aspect of the present invention, the unknown HIP can truly be an unknown HIP whereby the system 600 does not already know any "correct" answer to this HIP. In this case, human behavior can be monitored for an amount of time or over a number of users to determine a list of acceptable responses to the unknown HIP. For example, a random image could be presented to a plurality of users. The random image may be selected from a very large database of images or even randomly from the Internet. Each user can be asked a question such as "How would you describe this image?" or "What word does this image evoke?"

Images for which the answer to the question is consistent can be employed as HIPs presented to future users. Such HIPs can be considered known HIPs since their difficulty is known to be not too difficult. It should be understood that the same or identical answer is not necessary as long as some consistent word or set of words is given by a percentage of the prompted users.

The system 600, as described hereinabove, is not limited to sequence-based HIPs. Rather, HIPs of any type or class can be employed in a similar manner. For instance, an audio HIP can be developed and presented in a series of three audio HIPs, two of which are known to be easy, and one of which is of unknown difficulty. In particular, at least one unknown and at least one known audio HIP are provided. Therefore, combinations of three known and two unknown HIPs or any other combination are feasible in accordance with the subject invention.

Alternatively, at least one HIP of any difficulty can be displayed in accordance with another aspect of the present invention. Consider the following: users attempting to use automatic techniques to access some part of the Internet typically come from some number of IP addresses but probably not the entire Internet. For example, they may use a Proxy server of a large Internet Service Provider (ISP), such as America Online®. This has the effect that all users of the proxy service appear to come from the same IP address. Some of them are legitimate users and some of them are hackers trying to use automatic techniques to avoid the system 600. It is not possible to simply reject all requests from such an IP address, but it is understood that some or many of the attempts for access cannot be trusted. The system 600 can optionally detect which IP addresses appear to be using automatic techniques by examining their corresponding failure rates. The failure rates for these IP addresses should be unusually high since computers solve a HIP measurably less often than humans.

For IP addresses without high failure rates, the system can assume that they are nearly always operated by humans. They can be granted access no matter what they provide in response to an unknown HIP; and their answers can be employed to facilitate determining the difficulty of the unknown HIP.

Furthermore, an IP address can be given many challenges (e.g., HIPs) of only known difficulty. If the IP address consistently provides correct responses, then the system can assume that humans operate the address. Subsequently, the system 600 can present unknown HIPs occasionally to this IP address without including a HIP of known difficulty. Again, the system can assume that a human is answering any or all of the HIPs and then check how often the unknown HIPs are answered correctly. Access can always be granted to whatever the HIP controls whether or not they answer this unknown HIP correctly. Occasionally, known HIPs can be sent to the trusted IP address to verify that humans and humans that appear to make reasonable efforts to respond to the HIPs correctly are operating that IP address.

Figure 7:
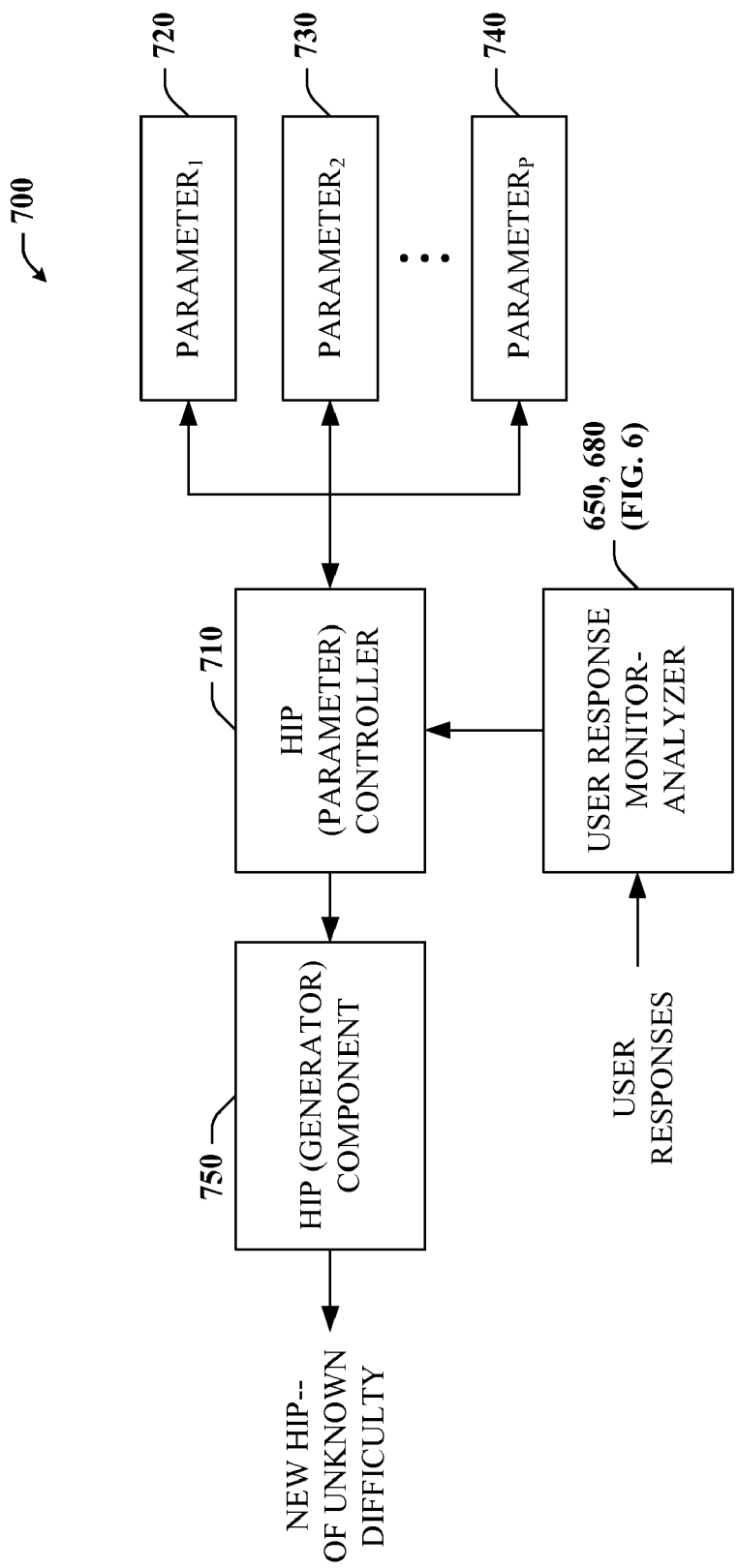
FIG. 7 is a schematic block diagram of a system that facilitates optimizing HIP parameters in connection with identifying human interaction in accordance with an aspect of the present invention.

Referring now to FIG. 7, there is illustrated a block diagram of an exemplary system 700 that facilitates optimizing a set of HIP parameters that consistently generate human solvable HIPs. Many HIPs have automatic parameters that determine the degree and type of distortion as well as other factors such as size of shapes or objects, number of lines, thickness of lines, shading or shadowing, line or image placement, and the like. The system 700 can be integrated into the system 600 in order to fine tune these parameter settings such that newly generated HIPs of unknown difficulty can be solved by humans. Essentially, the system 700 facilitates determining the difficulty of individual or subsets of HIP parameters.

The system 700 comprises a HIP parameter controller 710 that controls a plurality of parameters (e.g., at least one) which are employed in generating HIPs of known and unknown difficulty. The parameters can be denoted as parameter1 720, parameter2 730, and up to parameterP 740, wherein P is an integer greater than or equal to 1.

At least one or a subset of parameters extracted from some number of known HIPs can be adjusted in order to create a new HIP of unknown difficulty that is human solvable. At the parameter level, particular variations of parameters may lead to a non-solvable HIP whereas other variations of those parameters may lead to a solvable HIP. For example, in audio HIPs, the parameters determine how much noise is added. The amount of noise added to the audio HIP can either make it less difficult for a user to transcribe or can make it substantially more difficult for the user to transcribe. Many different types of distortions can be added or removed from audio HIPs. To keep the HIP in the human-solvable range, one subset of distortions can be adjusted in a particular way to create a fixed target (e.g., ideal settings) for other audio HIPs to follow. For instance, if an audio HIP is adjusted in manner W then, it should not also be adjusted in manner Q. Otherwise, the HIP can become too difficult for a human. Once it is determined which set or subset of parameters to modify, a HIP generator component 750 can create a new HIP of unknown difficulty and it can be "tested" thereafter to verify that it is not too difficult for humans.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 8:
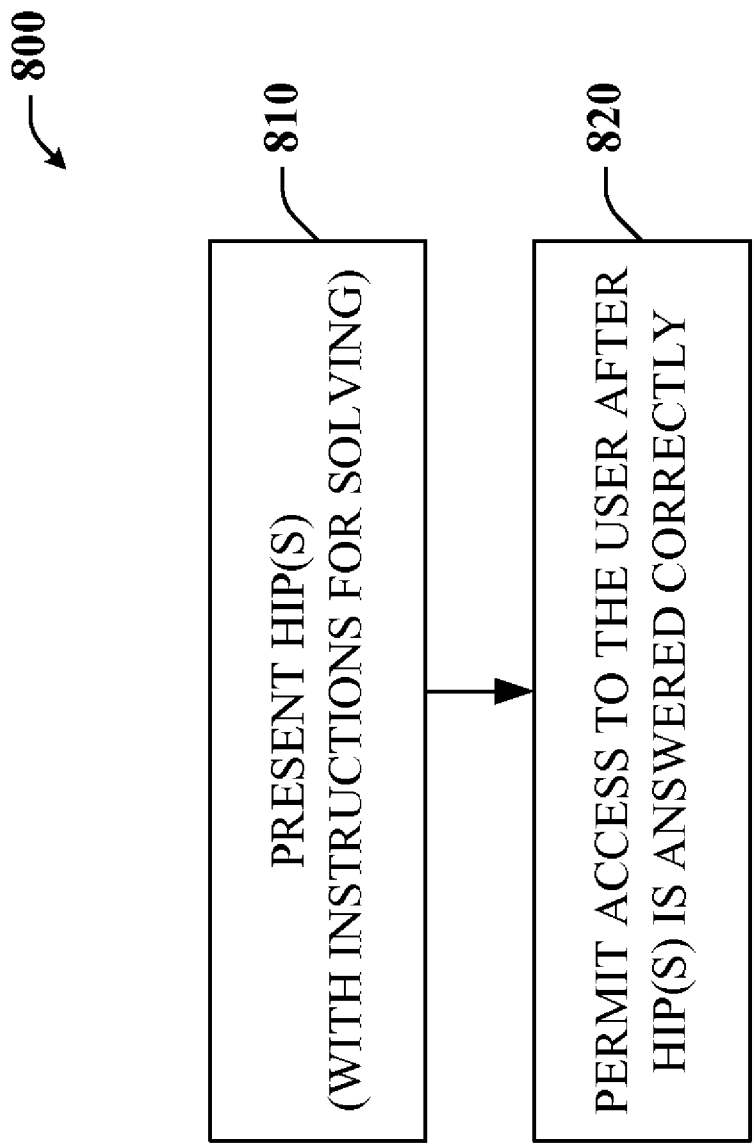
FIG. 8 is a flow diagram of an exemplary method that facilitates identifying human interaction in accordance with an aspect of the present invention.

Referring to FIG. 8, there is illustrated a flow diagram of an exemplary process 800 that facilitates identifying human interaction in accordance with an aspect of the present invention. The process 800 comprises presenting at least one HIP to a user and/or IP address at 810. In one instance, the HIP can comprise at least one of a known HIP and an unknown HIP. The known and/or unknown HIP can include at least one of an order-based HIP, a sequence-based HIP, and an audio HIP. The phrase "HIPs of known difficulty" means that when presented a given number of times, some percentage of users such as 90%, have answered the HIP correctly or consistently with respect to a plurality of other users who where presented with the same or similar HIP (e.g., HIP was presented to 100 users to determine difficulty).

Instructions for solving the HIP can also be provided with the HIP at 810. If at least one HIP of known difficulty is presented at 810, then at 820, access to an action or application controlled by the HIP can be granted when the HIP is answered correctly. Such HIPs can include sequence-based, order-based, as well as audio HIPs. "Correct" answers can comprise those answers which are truly accurate as well as those which include similar mistakes consistently made by a high enough percentage of users (e.g., percentage exceeds a threshold). In addition, "correct" answers can be determined and compiled by monitoring user behavior. For example, consistent answers provided by a set or subset of users can be used to annotate an answer list corresponding to a database of "unknown" images. Those images can then be used in future HIPs. Consistency can be based at least in part upon a percentage of users who provide the same or similar responses, wherein the percentage exceeds some threshold.

In cases where only an unknown HIP was presented to a trusted user or IP address, any answer provided by such user will be accepted and access will be granted as long as that user continues to provide consistent right answers to known HIPs as they are periodically presented.

Referring now to FIGS. 9 and 10, there are illustrated flow diagrams of an exemplary process that facilitates automatically determining a difficulty level of unknown HIPs in accordance with an aspect of the present invention. At 910, at least two HIPs can be presented to a user, wherein each HIP has about 4 characters. The actual number of HIPs as well as their character length can vary as desired by a HIP system that controls access to some computer-based action or application. In particular, at least one unknown HIP can be presented to a "trusted" user (e.g., see FIG. 6 and related discussion). The trustworthiness of a user or IP address can be ascertained at least in part by examining failure rates corresponding to the user or IP address. With respect to solving HIPs, relatively low failure rates can indicate that the IP address is operated by a human, whereas relatively high failure rates can indicate that the IP address or user is more likely a computer utilizing automated techniques to solve the HIPs.

At 920, the user's responses can be monitored by analyzing his/her response to the known HIP and then to the unknown HIP. The process which occurs at 920 is further explained in FIG. 10, infra. At 930, the previous processes at 910 and 920 are repeated in that the same or similar HIPs are presented to a plurality of users such as 50, 100 or 500 users. Following then, a percentage of time that the unknown HIP is answered correctly and/or consistently can be measured at 940. Likewise, a percentage of time that the unknown HIP is answered incorrectly can also be noted.

Based at least in part on the respective percentages, the difficulty of the unknown HIP can be determined at 950. In one example, unknown HIPs which are answered incorrectly 15% of the time (e.g., 15% of users presented with the HIP) can be discarded as being too difficult—assuming that the 15% exceeds an acceptable threshold. The many thresholds that can be employed in the present invention can be determined by the respective operators of the actions or applications to which access is desired.

In a second example, a percentage of users who consistently respond in the same or similar manner can also be employed to determine the difficulty of the unknown HIP. That is, the same answer is not required from every user. If about half the responses are "A" and about half the responses are "B", then A and B can be acceptable responses (e.g., considered "correct") because such responses are consistent. In this case, the difficulty of the HIP could be determined as not being too difficult for humans to solve. On the contrary, if an unknown HIP is presented 50 times and 25-30 different (e.g., inconsistent) answers are received then the HIP cannot be used since it is most likely too difficult to obtain consistent responses from humans.

As mentioned above, FIG. 10 demonstrates a flow diagram of an exemplary process 1000 that monitors user responses in connection with identifying human interaction. In particular, from 920 (FIG. 9), the user's response to the known HIP can be examined to determine whether the response is acceptable at 1010. An acceptable response to a known HIP is one that is either correct on its face or is consistent with a high enough number of other users. If the user provides an acceptable answer to the known HIP, then at 1020 and at 1030, respectively, his/her response to the unknown HIP is recorded and/or tracked to determine the difficulty level of the unknown HIP.

At 1040, user responses comprising inconsistent and/or incorrect answers to known HIPs can be discarded as they are not utilized to determine the difficulty of the unknown HIP. Furthermore, users who fail to provide an acceptable response to the known HIP are denied access to the desired HIP-controlled action or application. Conversely, users who successfully answer the known HIP are granted access regardless of their response to the unknown HIP.

Figure 11:
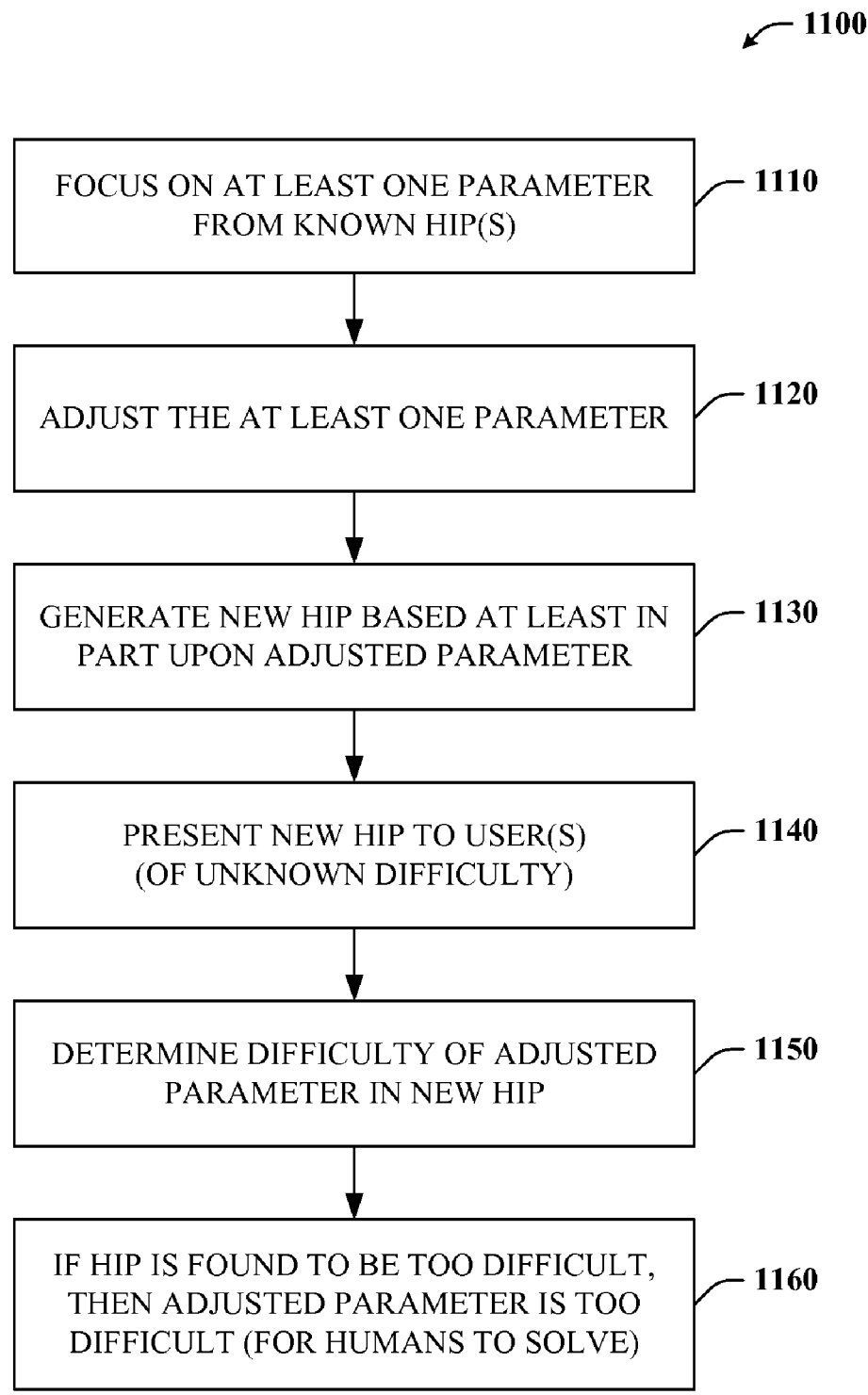
FIG. 11 is a flow diagram of an exemplary method that facilitates determining difficulty of HIP parameters in accordance with an aspect of the present invention.

Turning now to FIG. 11, there is illustrated a flow diagram of an exemplary process 1100 that facilitates determining the difficulty of HIPs at the parameter level in an automated fashion. The process 1100 involves focusing in on at least one parameter taken from a known HIP at 1110. That is, the parameter setting as implemented in the known HIP yields a HIP that is solvable by humans. At 1120, the at least one parameter setting can be adjusted in any desired manner. At 1130, a new HIP including the adjusted parameter setting can be generated. It should be understood that all other parameter settings (also taken from the known HIP) are maintained or held constant in order to determine the difficulty of the adjusted parameter.

At 1140, the new HIP of unknown difficulty can be presented to a user. After a number of users have provided their responses to the unknown HIP, the difficulty of the HIP and of the adjusted HIP parameter, in particular, can be determined at 1150. If the HIP is determined to be difficult, then the adjusted parameter can also be considered too difficult for humans. Combinations of parameters can also be tested in this manner to optimize HIP parameters in order to produce new HIPs that are almost always solvable by humans.

Figure 12:
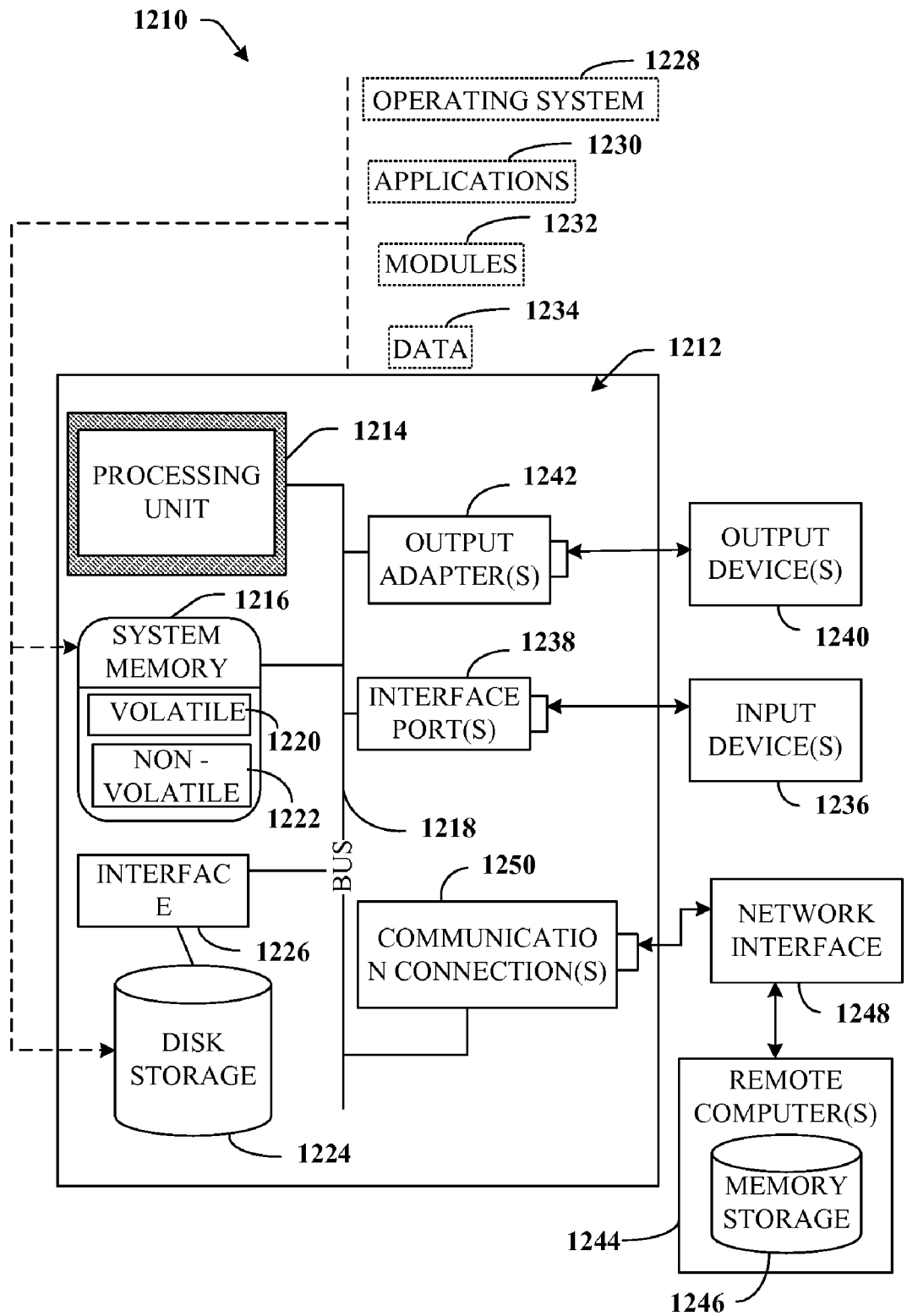
FIG. 12 is an exemplary environment for implementing various aspects of the invention.

In order to provide additional context for various aspects of the present invention, FIG. 12 and the following discussion are intended to provide a brief, general description of a suitable operating environment 1210 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples the system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic verification system that facilitates rating human interactive proof (HIP) string difficulty comprising:
   a processor and memory;
   a HIP component stored in the memory and executable by the processor, that presents to a user at least two HIPs to solve, the at least two HIPs comprising at least one HIP that is known to be solvable by a human and at least one HIP of unknown solvability by a human; and
   a monitor component stored in the memory and executable by the processor, that monitors and analyzes user responses to the at least two HIPs to determine whether the HIP of unknown solvability by a human is solved by the user.

2. The system of claim 1, wherein the two HIPs are presented at approximately the same time.

3. The system of claim 1, wherein the two HIPs are presented consecutively at different times.

4. The system of claim 1, wherein the HIP that is known to be solvable by a human refers to a percentage of users who have been able to provide consistent responses to the HIP, whereby the percentage exceeds a minimum threshold.

5. The system of claim 1, the at least two HIPs being presented in at least one of the same order and a random order to the user.

6. The system of claim 1, the two HIPs being generated by the HIP component based at least in part upon one or more parameters.

7. The system of claim 1, wherein users who provide acceptable answers to the HIP that is known to be solvable by a human are presumed to be humans.

8. The system of claim 6, wherein acceptable answers comprise at least one of the following:
   a correct answer; and
   an answer consistently provided by a percentage of users, wherein the percentage exceeds a minimum threshold.

9. The system of claim 6, wherein the monitor component analyzes the user's response to the HIP of unknown solvability by a human when the user provides an acceptable answer to the HIP that is known to be solvable by a human.

10. The system of claim 1, wherein the monitor component performs at least one of the following:
    measures a percentage of users who answer the HIP of unknown solvability by a human correctly;
    measures a percentage of users who provide similar responses to the HIP of unknown solvability by a human; and
    measures a percentage of users who provide wrong answers to the HIP of unknown solvability by a human.

11. The system of claim 10, when the percentage of time the HIP of unknown solvability by a human is answered correctly exceeds a threshold, determining the HIP of unknown solvability by humans to be solvable by humans.

12. The system of claim 10, when the percentage of users who provide similar responses to the HIP of unknown solvability by a human exceeds a threshold, determining that the HIP of unknown solvability by humans to be solvable by humans.

13. The system of claim 12, wherein the similar responses comprise at least one similar mistake.

14. The system of claim 10, wherein the monitor component discards the HIP of unknown solvability by humans when the percentage of users who provide wrong answers to the HIP of unknown solvability by a human exceeds a threshold.

15. The system of claim 1, wherein the monitor component analyzes and tracks a number of different correct answers for the HIP of unknown solvability by a human.

16. The system of claim 15, wherein the monitor component discards the HIP of unknown solvability by a human when the number of different correct answers exceeds a threshold.

17. The system of claim 1, the user being an IP address.

18. The system of claim 17, wherein the IP address is known to be operated by humans.

19. The system of claim 18, wherein knowing that the IP address is operated by humans is based at least upon the at least two HIPs being solved by the IP address.

20. The system of claim 18, wherein the HIP component randomly requests the IP address to answer at least one HIP that is known to be solvable by a human to verify that the IP address continues to be operated by humans.

21. The system of claim 18, wherein the HIP component randomly requests the IP address to answer at least one HIP of unknown solvability by a human to facilitate determining the difficulty of the HIP of unknown solvability in an automated fashion.

22. The system of claim 1, further comprising an access control component that controls access to at least one of a desired computer-based action and computer-based application and that grants access to the user for acceptable response to at least the first HIP that is known to be solvable by a human.

23. The system of claim 1, further comprising a HIP parameter controller that controls a plurality of parameters which are at least partially utilized in generating HIPs.

24. The system of claim 23, the HIP parameter controller further modifying at least one parameter employed in the HIP that is known to be solvable by a human to generate a new HIP of unknown solvability by a human to facilitate determining a difficulty rating of the at least one parameter in an automated fashion.

25. The system of claim 1, the HIP that is known to be solvable by a human and the HIP of unknown solvability by a human being any one of an order-based HIP, a sequence-based HIP, and an audio HIP.

26. A computer-implemented method that facilitates determining a difficulty level of HIPs in an automated fashion comprising:
   under control of one or more processors configured with executable instructions:
      presenting at least two HIPs to an IP address desiring access to a protected resource to solve, the at least two HIPs comprising at least one HIP that is known to be solvable by a human and at least one HIP of unknown solvability by a human, wherein the at least one HIP that is known to be solvable by a human and at least one HIP of unknown solvability by a human are unsolvable by an optical character recognition (OCR) system;
      monitoring the IP address for a response to the at least one HIP that is known to be solvable by a human; and
      if the response to the HIP that is known to be solvable by a human is acceptable, then subsequently monitoring the IP address for a response to the at least one HIP of unknown solvability by a human to facilitate determining whether the HIP of unknown solvability by a human is solvable by humans.

27. The computer-implemented method of claim 26, wherein an acceptable answer comprises at least one of the following:
   a correct answer; and
   an answer consistently provided by a percentage of responses, wherein the percentage exceeds a minimum threshold.

28. The computer-implemented method of claim 26, wherein the protected resource comprises at least one of a computer-based action and a computer-based application.

29. The computer-implemented method of claim 26, wherein an acceptable answer to the HIP that is known to be solvable by a human indicates that the response is from a human.

30. The computer-implemented method of claim 26, wherein a percentage of acceptable answers to the HIP of unknown solvability by a human exceeds a threshold indicates that the HIP is solvable by humans.

\* \* \* \* \*